March 8, 1938.                W. RAISCH                2,110,309
                             INCINERATION
                          Filed Nov. 12, 1936

INVENTOR
WILLIAM RAISCH
BY Louis L. Ansart
his ATTORNEY

Patented Mar. 8, 1938

2,110,309

UNITED STATES PATENT OFFICE 2,110,309

INCINERATION

William Raisch, New York, N. Y., assignor to Underpinning & Foundation Co., Inc., New York, N. Y., a corporation of New York Application November 12, 1936, Serial No. 110,419

9 Claims. (Cl. 110—12)

This invention relates to incineration and more particularly to improvements in tiered multiple-hearth furnaces and to improvements in processes for drying and burning material of a high moisture or volatile content by passing it downwardly through a plurality of zones, gradually drying it in upper zones and finally burning it in lower zones.

Although the apparatus and method of the present invention are applicable to the treatment of many kinds of material, they are of particular value in drying and burning waste material such as garbage and sewage materials including sewage sludge and sewage screenings both of which have a substantial moisture content.

The principal objects of the invention are to provide novel, advantageous and effective forms of apparatus and processes adapted for treatment of materials of the general character specified. Another object relates to improved means for heating the interior of the drying section by use of the gases of combustion from the burning section. Another object of the invention relates to improved hearth construction for the drying section to enable better heat exchange between the waste gases of combustion and the air and vapors in the drying section. A further object relates to improved heat exchange means whereby heat from the combustion gases is supplied to the interior of the drying section from the top and sides of the section but also from the upper and lower surfaces of the hearth.

In carrying out the invention, use may be made of a multiple-hearth furnace divided into an upper drying section and a lower burning section by a hearth provided with a device which feeds material from the compartment above the dividing hearth to the next lower compartment without permitting the flow of gas therethrough. Air is supplied to the upper part of the drying section and passed downwardly therethrough and then is passed from the bottom of the drying zone to the lower part of the burning section. The furnace may also have a hollow top through which the hot gases pass before final discharge from the furnace. An important feature of the present invention relates to the passage of the hot gases from the burning section through one or more hollow hearths of the drying section and through a series of peripherally arranged ducts to upper hollow hearths or to the hollow top of the furnace, each hollow hearth being so divided by a substantially horizontal partition so that the gases will flow toward the center along the lower side of the hearth, then upwardly around the edge of the partition and then outwardly to ducts at the peripheral wall through which it flows upwardly to the next hollow hearth or to the hollow top of the furnace. The heat transfer to the interior of the drying section is obviously very complete and it may not be necessary to preheat the air before its passage into the drying section.

In the drawing, Figure 1 is a view in vertical section of the apparatus of the present invention.

Figure 1:
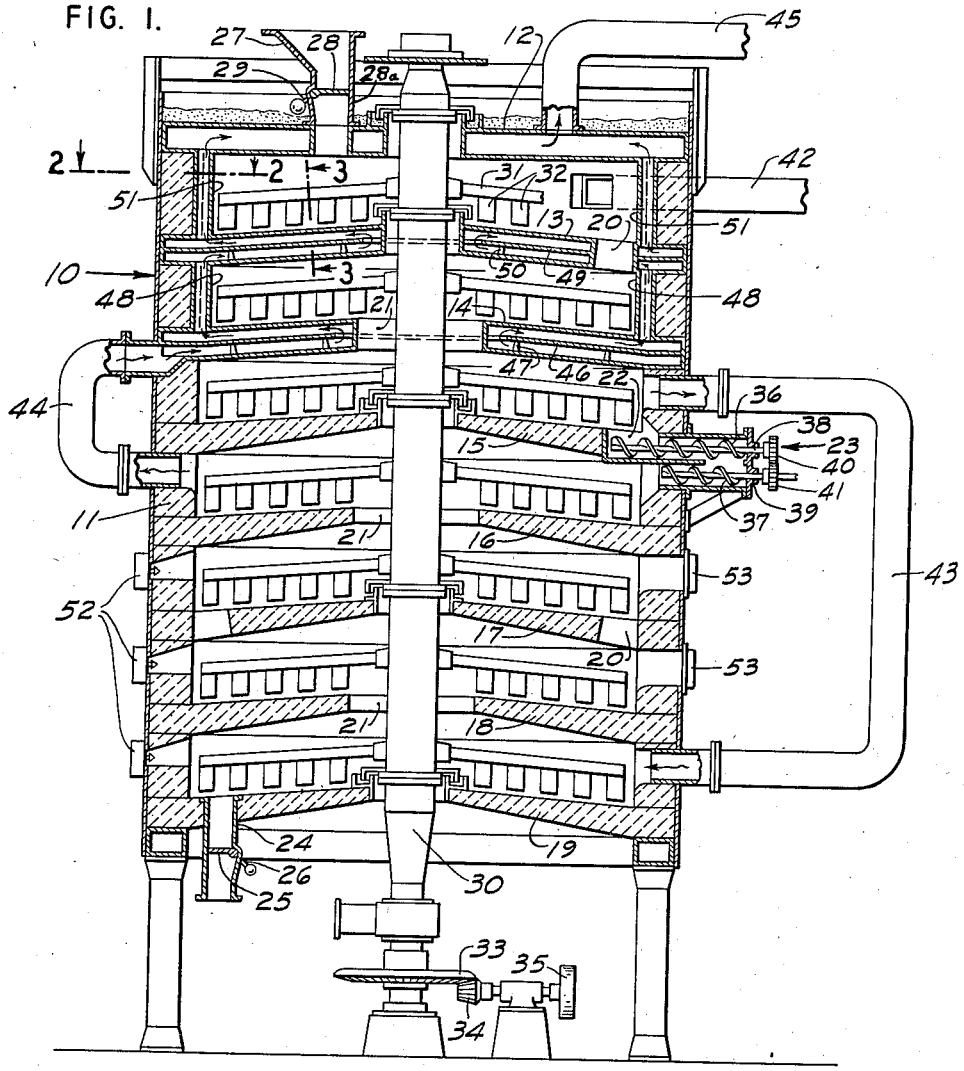
Figure 2:
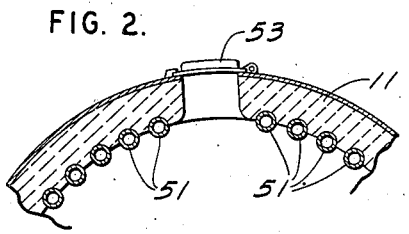
Figure 2 is a fragmentary section on line 2—2 of Figure 1.
Figure 3:
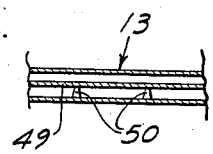
Figure 3 is a fragmentary section on line 3—3 of Figure 1.

Referring to the drawing in which there is illustrated a preferred form of apparatus including a multiple-hearth furnace 10 having a peripheral wall 11, a hollow top 12 and hearths 13, 14, 15, 16, 17, 18 and 19 of which the hearth 19 forms the bottom of the furnace. In order to permit the downward movement of the material from hearth to hearth the uppermost hearth 13 is provided with one or more peripheral outlets 20, the hearth 14 is provided with a central outlet 21, the hearth 15 is provided with a peripheral outlet 22 equipped with a feeding device 23 for feeding the material from the compartment above the hearth 22 to the compartment below the hearth 22 which prevents the passage of gas between the two compartments, the hearth 16 is provided with a central opening 21, the hearth 17 is provided with one or more peripheral openings 20, the hearth 18 is provided with a central opening 21 and the hearth 19 or bottom of the furnace is provided with an outlet or chute 24 normally closed by a door or gate 25 urged to closing position by weighted arm 26. Suitable gas seals around the shaft 30 are provided at the top 12 and the hearths 13, 15, 17 and 19. At the top of the furnace, material is introduced into the uppermost compartment through a hopper 27, a chute 28a passing through the hollow top 12 and provided with a pivoted gate 28 normally held in closed position by a weighted arm 29.

Positioned substantially axially with reference to the furnace is a hollow shaft 30 carrying rabbling devices which extend over the upper surfaces of said hearths, each of these rabbling devices constituting an arm 31 and blades 32 so inclined with the rabbling devices over the hearths 13, 15, 17 and 19 so as to work the material outwardly on these hearths, and so inclined above the hearths 14, 16 and 18 as to work the material toward the central openings 21. The shaft 30 may be operated in any suitable manner as by means of a bevel gear 33 thereon, a bevel gear 34 meshing with the bevel gear 33 and a pulley 35 connected with the bevel gear 34 and operated from any suitable source of power.

The feeding device or valve 23 at the hearth 15 may be of any suitable kind, but is here shown as made up of two feed screws, one of which, 36, feeds the material outwardly and the other of which, 37, receives the material from the screw 36 and works it inwardly to discharge it into the compartment below the hearth 15. The screws 36 and 37 may be mounted on shafts 38 and 39 respectively and connected for driving in opposite directions by means of intermeshing gears 40 and 41.

Air is introduced into the upper part of the drying section by means of a duct 42 and passes downwardly through the drying section, and then, laden with vapors of moisture and volatile materials, is passed through a duct 43 to the lower part of the burning section, preferably to the lowermost compartments of the burning section. From the upper part of the burning zone, the hot gases of combustion are passed through a duct 44 to the lowermost hollow hearth 14 of the drying section, then through the upper hearth 13 and to the hollow top from which they are discharged through a duct 45.

Except for the positions of the outlets, the hearths 13 and 14 are very similar. The hearth 14 is hollow and midway between its upper and lower walls is provided with an annular partition 46 extending from the outside peripheral wall of the hollow hearth to a position somewhat short of the chamber wall around the shaft 30 so that hot gases introduced into the hearth below the partition 46 will flow inwardly along the bottom of the hearth, upwardly at the center of the hearth and then outwardly beneath the top wall of the hearth. Proper spacing between the bottom wall of the hearth 14 and the partition 46 may be obtained by use of suitable spacing devices 47. Adjacent to the interior surface of the peripheral wall 11 of the furnace, the upper chamber of the hearth 14 is connected with a plurality of ducts 48 extending upwardly and around a considerable portion of the periphery of the drying chamber which ducts communicate with a lower compartment in hearth 14 separated from the upper compartment therein by means of a central partition 49 supported from the lower wall of the hearth by means of suitable spacing devices 50. In this hearth as in the hearth 14 the hot gases of combustion are passed inwardly around the inner edge of the partition and then pass upwardly through a series of ducts 51 to the hollow top 12 of the furnace.

In order to aid in starting the furnace and to assure the proper temperature the furnace may be provided at suitable points with burners 52. Access to the different compartments may be had through doors 53.

Obviously the heat in the hot combustion gases is used very effectively in heating the interior of the drying section and the air therein. It may therefore be unnecessary to preheat the air supplied to the drying section.

It should be understood that various changes may be made and that various features may be used without others without departing from the true spirit and scope of the invention.

Having thus described my invention, I claim:

1. In a tiered multiple-hearth furnace including an intermediate hearth with a gas seal separating the furnace into an upper drying section and a lower burning section, means for supplying air to the drying section, means for passing air and vapor from the drying section to the burning section and means for discharging hot combustion gases from the burning section, means for heating the interior of the drying section by means of said hot combustion gases comprising a hollow hearth and a partition therein dividing the hearth into a lower compartment receiving the hot combustion gases and an upper compartment communicating with the lower compartment near the center of the hearth and receiving the hot gases from the lower compartment, and means for discharging the hot combustion gases from said upper compartment.

2. In a tiered multiple-hearth furnace including a peripheral wall, an intermediate hearth with a gas seal separating the furnace into an upper drying section and a lower burning section, means for supplying air to the drying section, means for passing air and vapors from the drying section to the burning section and means for discharging hot combustion gases from the burning section, means for heating the interior of the drying section by means of said hot combustion gases comprising a hollow furnace top, a hollow uppermost hearth and a partition therein dividing the hearth into a lower compartment receiving the hot combustion gases and an upper compartment communicating with the lower compartment near the center of the hearth and receiving the hot gases from the lower compartment, means for conducting the hot combustion gases from said upper compartment upwardly along the inner surface of said peripheral wall in heat exchange relationship with the interior of the furnace and discharging the same into said hollow top, and means for discharging the combustion gases from said hollow top.

3. In a tiered multiple-hearth furnace including a peripheral wall, an intermediate hearth with a gas seal separating the furnace into an upper drying section and a lower burning section, means for supplying air to the drying section, means for passing air and vapor from the drying section to the burning section and means for discharging hot combustion gases from the burning section, means for heating the interior of the drying section by means of said hot combustion gases comprising a hollow furnace top, a hollow uppermost hearth and a partition therein dividing the hearth into a lower compartment receiving the hot combustion gases and an upper compartment communicating with the lower compartment near the center of the hearth and receiving the hot gases from the lower compartment, ducts arranged around the inner surface of the peripheral wall for conducting the hot combustion gases from said upper compartment upwardly along the inner surface of said peripheral wall in heat exchange relationship with the interior of the furnace and discharging the same into said hollow top, and means for discharging the combustion gases from said hollow top.

4. In a tiered multiple-hearth furnace including an intermediate hearth with a gas seal separating the furnace into an upper drying section and a lower burning section, means for supplying air to the drying section, means for passing air and vapor from the drying section to the burning section and means for discharging hot combustion gases from the burning section, means for heating the interior of the drying section by means of said hot combustion gases comprising a hollow hearth and an annular partition therein dividing the hearth into a lower compartment receiving the hot combustion gases and an upper compartment communicating with the lower compartment near the center of the hearth around the inner edge of said annular partition and receiving the hot gases from the lower compartment, and means for discharging the hot combustion gases from said upper compartment.

5. In a tiered multiple-hearth furnace including a peripheral wall, an intermediate hearth with a gas seal separating the furnace into an upper drying section and a lower burning section, means for supplying air to the drying section, means for passing air and vapor from the drying section, means for passing air and vapor from the drying section to the burning section and means for discharging hot combustion gases from the burning section, means for heating the interior of the drying section by means of said hot combustion gases comprising a plurality of hollow hearths, a partition in each hearth dividing the hearth into a lower compartment receiving the hot combustion gases and an upper compartment communicating with the lower compartment near the center of the hearth and receiving the hot gases from the lower compartment, means for conducting gases from the upper compartment of a lower hollow hearth to the lower compartment of the next higher hollow hearth, and means for discharging the hot combustion gases from the upper compartment of the uppermost hollow hearth.

6. In a tiered multiple-hearth furnace including an intermediate hearth with a gas seal separating the furnace into an upper drying section and a lower burning section, means for supplying air to the drying section, means for passing air and vapor from the drying section to the burning section and means for discharging hot combustion gases from the burning section, means for heating the interior of the drying section by means of said hot combustion gases comprising an annular hollow hearth and an annular partition therein dividing the hearth into a lower compartment receiving the hot combustion gases and an upper compartment communicating with the lower compartment near the inner edge of the hearth and receiving the hot gases from the lower compartment, and means for discharging the hot combustion gases from said upper compartment.

7. The method which comprises passing material of high moisture content downwardly through a plurality of zones while first drying and then burning the same, temporarily retaining said material in each of a plurality of said zones, moving said material substantially horizontally through each of said zones by the application of a series of rabbling impulses thereto, preventing the direct passage of gases between two adjacent zones, thereby separating the zones into a drying group and a burning group, passing a stream of air downwardly through the zones of the drying group along the path of travel of the material, discharging air and vapor from the lower part of the drying group and introducing them into the lowermost burning zone, passing the gaseous products of combustion from one of the burning zones over one of the drying zones in heat exchanging relationship with the air and vapors therein but separated therefrom and then beneath the next higher drying zone in heat exchanging relationship therewith, and discharging the hot combustion gases from the drying zones.

8. The method which comprises passing material of high moisture content downwardly through a plurality of zones while first drying and then burning the same, temporarily retaining said material in each of a plurality of said zones, moving said material substantially horizontally through each of said zones by the application of a series of rabbling impulses thereto, preventing the direct passage of gases between two adjacent zones, thereby separating the zones into a drying group and a burning group, passing a stream of air downwardly through the zones of the drying group along the path of travel of the material, discharging air and vapor from the lower part of the drying group and introducing them into the lowermost burning zone, passing the gaseous products of combustion from one of the burning zones over one of the drying zones in heat exchanging relationship with the air and vapors therein but separated therefrom and then beneath the next higher drying zone in heat exchanging relationship therewith, and finally passing the hot gases over the uppermost drying zone and discharging them from the drying zones.

9. The method which comprises passing material of high moisture content downwardly through a plurality of zones while first drying and then burning the same, temporarily retaining said material in each of a plurality of said zones, moving said material substantially horizontally through each of said zones by the application of a series of rabbling impulses thereto, preventing the direct passage of gases between two adjacent zones thereby separating the zones into a drying group and a burning group, passing a stream of air downwardly through the zones of the drying group along the path of travel of the material discharging air and vapor from the lower part of the drying group and introducing them into the lowermost burning zone, passing the gaseous products of combustion from one of the burning zones over one of the drying zones in heat exchanging relationship with the air and vapors therein but separated therefrom and then beneath the next higher burning zone in heat exchanging relationship therewith, passing the hot gases upwardly around said next higher drying zone and then over the same in heat exchanging relationship therewith, and finally discharging said hot gases.

WILLIAM RAISCH.